Sept. 30, 1952 — H. W. DRIEHAUS — 2,612,362
KERF-CUTTING MACHINE
Filed Feb. 7, 1948 — 5 Sheets-Sheet 5
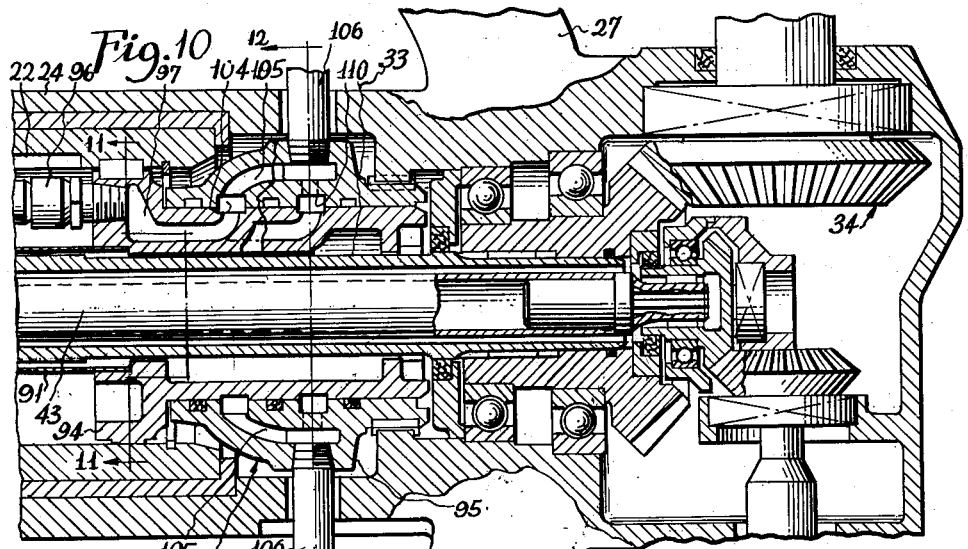
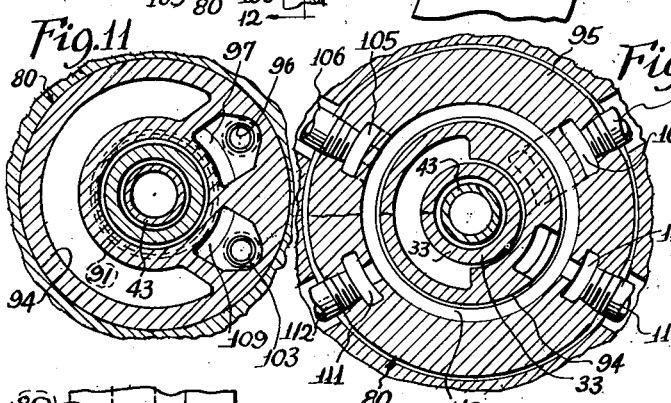
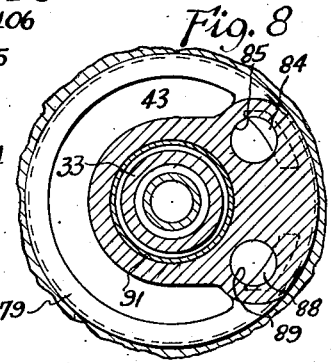
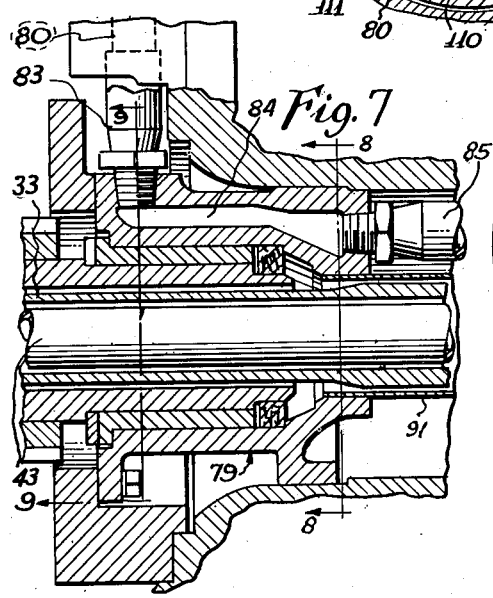
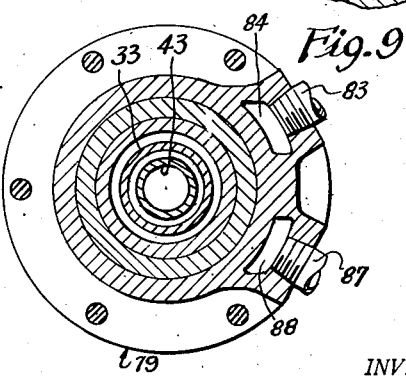
INVENTOR.
Herman W. Driehaus
BY Clarence F. Poole
ATTORNEY Patented Sept. 30, 1952

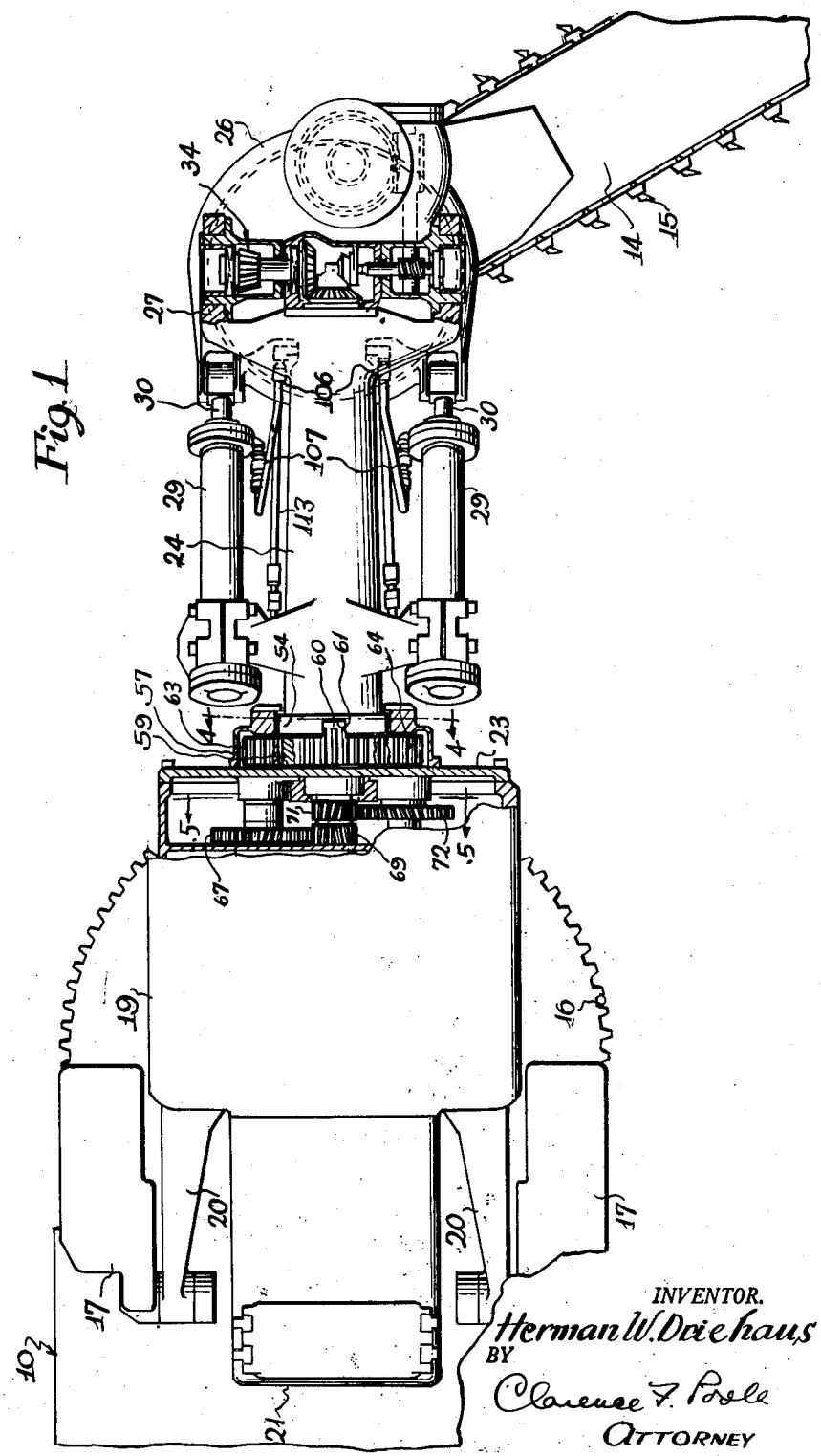

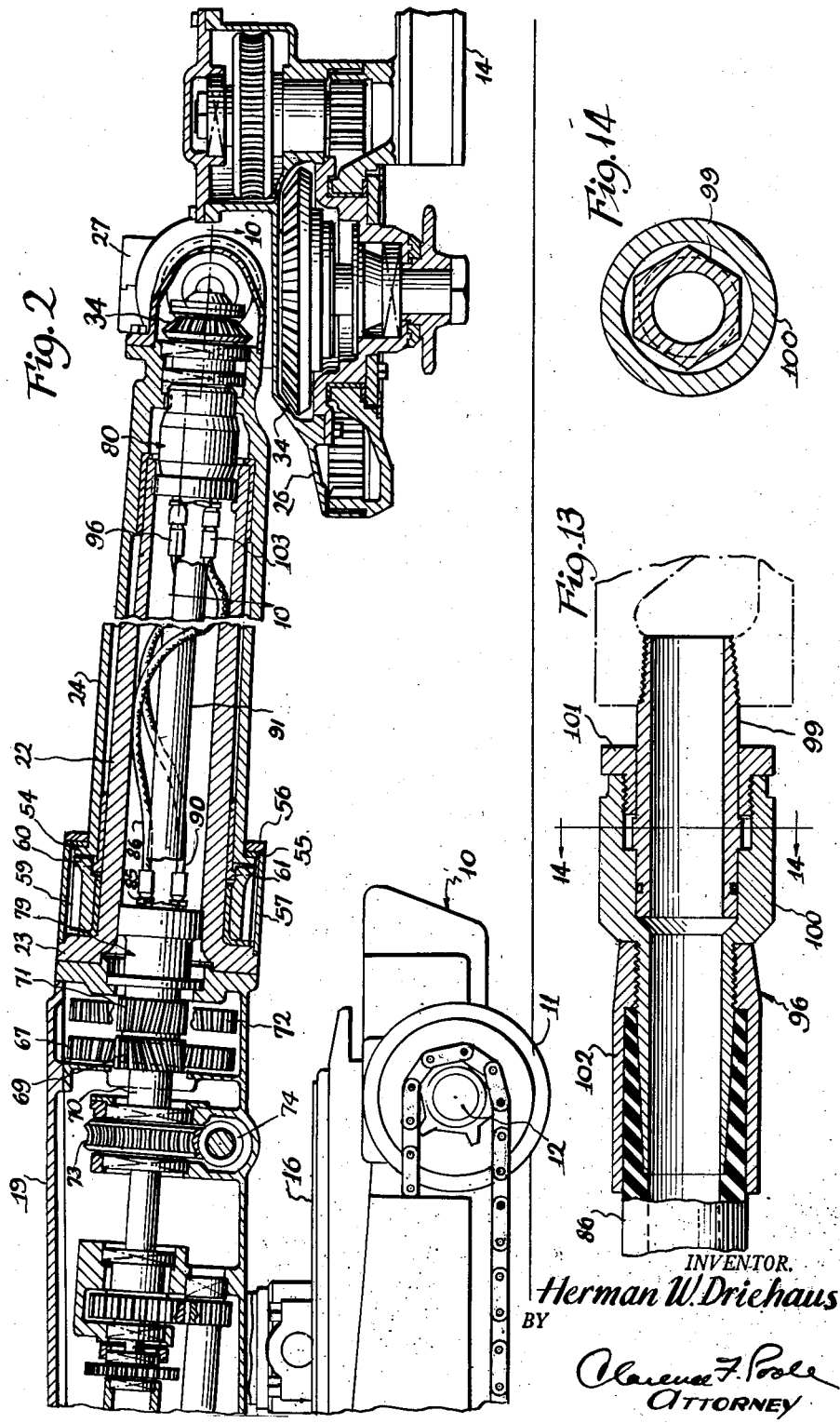

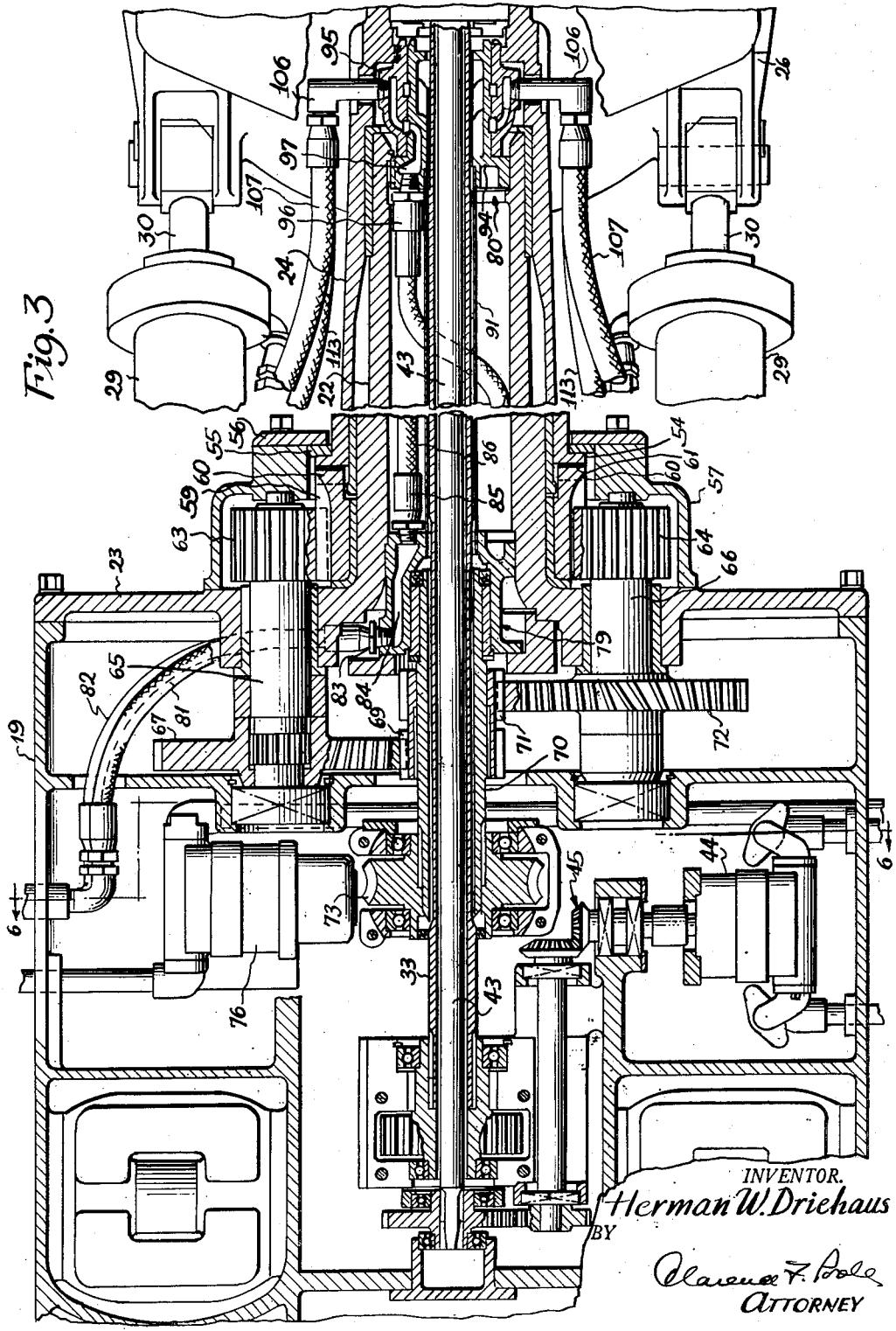

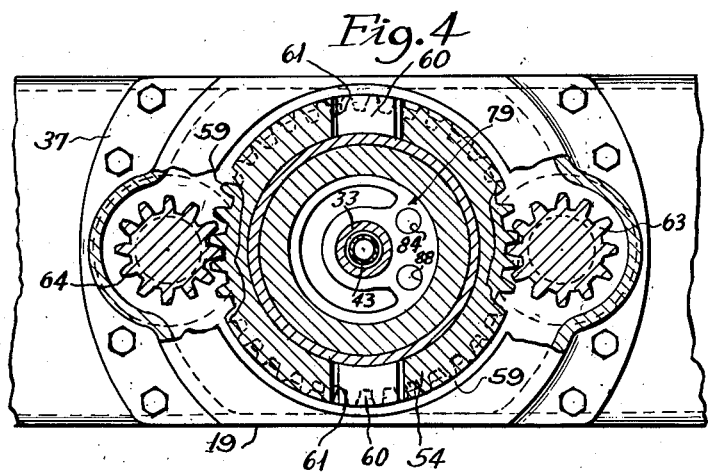
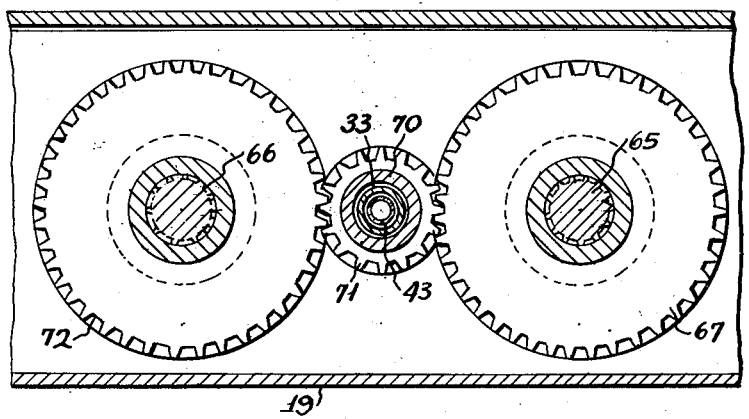
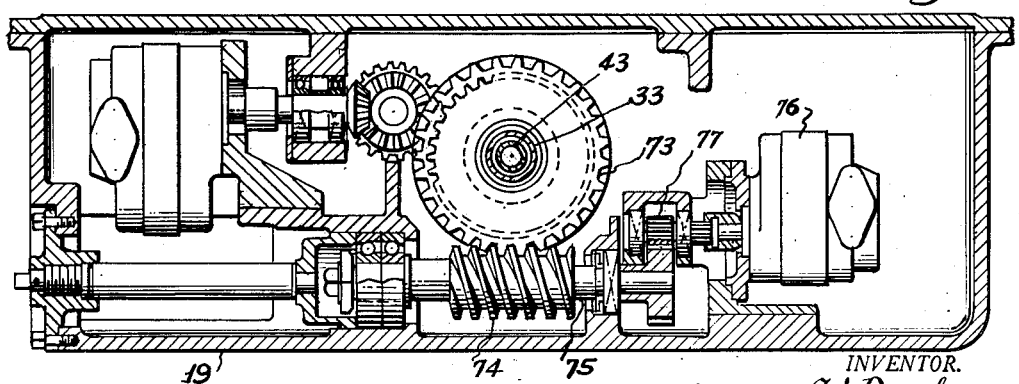

2,612,362

UNITED STATES PATENT OFFICE 2,612,362

KERF-CUTTING MACHINE

Herman W. Driehaus, Chicago, Ill., assignor to Goodman Manufacturing Company, Chicago, Ill., a corporation of Illinois Application February 7, 1948, Serial No. 6,957

13 Claims. (Cl. 262—28)

This invention relates to improvements in kerf-cutting machines, and more particularly relates to improved positioning means for the cutter bar of a kerf-cutting machine of the type in which the cutter bar is supported for cutting kerfs in various planes relative to the mine floor including horizontal and vertical shearing kerfs, for positioning the cutter bar to cut in the desired cutting plane.

An object of my invention is to provide a novel and efficient form of self-locking balanced drive for turning the cutter bar of a kerf-cutting machine about a generally longitudinal axis, and arranged to automatically compensate for inaccuracies in the drive gearing for turning said cutter bar.

Another object of my invention is to provide a simple and efficient balanced and equalizing arrangement of drive gearing for turning a cutter bar of a kerf-cutting machine about a generally longitudinal axis, to position said cutter bar to cut in various desired cutting planes, together with a simplified construction of fluid transmitting means for transmitting fluid under pressure to tilt the bar about a transverse axis regardless of the position of the bar about said longitudinal axis.

A still further object of my invention is to provide a simplified arrangement of manifolds and fluid pressure transmitting devices connected therebetween, to supply fluid to the motor devices for tilting the cutter bar about an axis transverse to the longitudinal axis of turning movement of said bar, in all positions of adjustment of the bar about said longitudinal axis.

These and other objects of my invention will appear from time to time as the following specification proceeds and with reference to the accompanying drawings wherein:

Figure 1 is a fragmentary plan view of the forward end of a kerf-cutting machine constructed in accordance with my invention, with certain parts broken away and certain other parts shown in substantially horizontal section;

Figure 2 is an enlarged fragmentary view in side elevation of the machine shown in Figure 1, with certain parts thereof shown in substantially longitudinal section;

Figure 3 is an enlarged detail fragmentary horizontal sectional view of the machine shown in Figure 1;

Figure 4 is an enlarged fragmentary transverse sectional view taken substantially along line 4—4 of Figure 1;

Figure 5 is an enlarged fragmentary transverse sectional view taken substantially along line 5—5 of Figure 1;

Figure 6 is a transverse sectional view taken substantially along line 6—6 of Figure 3;

Figure 7 is an enlarged partial fragmentary horizontal sectional view showing certain details of the rear manifold for supplying fluid under pressure to the devices for tilting the cutter bar about an axis transverse to its supporting arm;

Figure 8 is a sectional view taken substantially along line 8—8 of Figure 7;

Figure 9 is a sectional view taken substantially along line 9—9 of Figure 7;

Figure 10 is an enlarged detail horizontal sectional view showing certain details of the forward manifold for transmitting fluid under pressure to the tilting devices for the cutter bar;

Figure 11 is a sectional view taken substantially along line 11—11 of Figure 10;

Figure 12 is a sectional view taken substantially along line 12—12 of Figure 10;

Figure 13 is an enlarged detail fragmentary longitudinal sectional view showing certain details of the connection of one of the fluid conduits to its manifold; and Figure 14 is a transverse sectional view taken substantially along line 14—14 of Figure 13.

The kerf-cutting machine illustrated in the drawings is of the same general type as is shown in Patent No. 2,323,493, dated July 6, 1943, which issued to William W. Sloane, so need only herein be shown and described in so far as is necessary to clearly illustrate the novel features of my present invention. Said kerf-cutting machine includes generally a base frame 10 supported on forward and rear track wheels 11, 11 and axles 12, 12. Said base frame with said track wheels and axles forms a truck for supporting the machine and feeding a projecting cutter bar 14 having a cutter chain 15 movable thereabout to cut the desired kerf in the coal face.

A turntable 16 is mounted at the front end of the base frame 10 and has a pair of upwardly and rearwardly extending trunnions 17, 17 at opposite sides thereof, forming a trunnion support for a forwardly extending tilting frame 19.

The tilting frame 19 has a pair of rearwardly extending arms 20, 20 pivotally connected to the trunnions 17, 17. Said tilting frame is disposed generally in a horizontal plane above the turntable and extends forwardly of said trunnions and is arranged to be swung upwardly or downwardly relative to the latter by suitable hydraulic jacks (not shown) carried on the turntable. Said tilting frame has an electric motor 21 at its rear end, disposed between the rearwardly extending arms 20, 20, which provides power for driving the cutter chain 15 about the cutter bar 14. A hollow bearing support 22 having a widened rear end portion 23 projecting laterally in opposite directions from the hollow central portion thereof, is secured at its widened rear end portion to the forward end of the tilting frame 19, and extends a substantial distance in advance of said tilting frame and forms a continuation thereof. Said hollow bearing support forms an elongated support for rotatably supporting a tubular extension arm 24, for adjustment about a generally longitudinal axis.

A cutter head 26 is trunnioned for tilting movement about an axis extending transversely of said arm in a yoke 27 projecting forwardly from said arm. Tilting of said cutter head relative to said extension arm is controlled by a pair of hydraulic motor devices herein shown as being double acting hydraulic cylinders 29, 29, pivotally mounted adjacent their rear or head ends at opposite sides of said extension arm, as shown in Patent No. 2,323,493. Piston rods 30, 30 extensible from the front ends of said cylinders, are pivotally connected to said cutter head adjacent opposite sides thereof, for tilting said head or holding it in the desired position of adjustment.

A hollow shaft 33 journaled in the hollow bearing support 22 and the extension arm 24, is provided to drive the cutter chain 15 about the cutter bar 14 through suitable bevel gear trains indicated generally by reference character 34, and not herein described in detail since they are no part of my present invention.

A longitudinal shaft 43 journaled for rotation within the hollow shaft 33 and projecting beyond the forward end thereof, is provided to swing the cutter bar 14 by power about the axis of its drive sprocket. The drive to said shaft and the drive from said shaft to said cutter bar need not herein be described in detail since they form no part of my present invention.

The extension arm 24, journaled on the hollow bearing support 22, has a flanged rear end portion 54, the forward end of which is adapted to be engaged by an annular bearing 55, held in position by an annular ring 56. Said annular ring is secured to and extends forwardly from an annular housing and bearing support 57, which is secured to and extends forwardly of the forward end of the laterally extending portion 23 of said bearing support. A spur gear 59 is suitably journaled on said hollow bearing support just forwardly of said laterally extending portion thereof, for rotatably moving said arm. Said spur gear has a plurality of jaws 60, 60 extending forwardly therefrom and engaging corresponding recesses 61, 61 formed in the rear end of the flanged portion 54 of said extension arm, so as to provide a relatively loose driving connection between said spur gear and extension arm, permitting a limited amount of weaving movement of said extension arm with respect to said spur gear about axes transverse to the axis of rotation thereof, and preventing binding between said gear and arm when under severe loads.

Two similar spur pinions 63 and 64, herein shown as being at diametrically opposite sides of the spur gear 59, mesh with and drive said spur gear (see Figures 3 and 4). Said spur pinions 63 and 64 are keyed on longitudinally extending shafts 65 and 66, respectively. A helical gear 67 is splined on the longitudinal shaft 65 adjacent its rear end, for driving said shaft. Said helical gear is meshed with and is driven from a helical pinion 69 mounted on a hollow shaft 70, which is coaxial with and encircles the hollow shaft 33. Said helical pinion is herein shown as being feathered on said hollow shaft 70 for free movement along said shaft, in the direction of the axis thereof. A helical pinion 71 spaced forwardly of and in alignment with the helical pinion 69, is herein shown as being formed integrally with said helical pinion 69. Said helical pinion 71 has its teeth cut on a helix angle opposite to the helix of the teeth of said helical pinion 69 and meshes with and drives a helical gear 72, splined on the longitudinal shaft 66.

The hollow shaft 70 has a worm gear 73 keyed on its rear end, which is driven from a worm 74 on a transverse shaft 75 (see Figure 6). Said worm is driven from a fluid motor 76 through a spur gear train indicated generally by reference character 77. Said worm and worm gear may be of a self-locking type, to lock said extension arm in any of its various positions of adjustment with respect to the tilting frame 19.

Since the helix angles of the teeth of the helical pinions 69 and 71 are opposite to each other, the helix angles of the teeth of the helical gears 67 and 72 are also opposite, and where the driving forces on each spur pinion 63 and 64 are equal, the teeth of the helical pinions 69 and 71 will mesh equally with the teeth of their helical gears, and the transverse center lines of said gears and pinions will be substantially in alignment with each other. Where, however, the driving forces might be unequal due to inaccuracies in the gears driven thereby, the pinions 69 and 71 will slide along said hollow shaft 70 in one direction or another until said driving forces are equal. This will provide an equalized balanced drive for driving both pinions 63 and 64 at the same rate of speed regardless of inaccuracies in said pinions or the gear 59 driven thereby, or the helical gearing driving said pinions. Said helical pinions are of such a width that they may slide along the hollow shaft 70 in one direction or another a distance far enough to compensate for inaccuracies of substantially one-half pitch and still fully mesh with their mating helical gears, although said pinions may be arranged to slide to compensate for greater inaccuracies, if desired.

The means for transmitting fluid under pressure to the head and piston rod ends of the cylinders 29, 29, for tilting the cutter head 26 about an axis perpendicular to the axis of turning movement of the arm 20 and for holding said cutter head in the desired position of adjustment with respect to said arm includes two spaced annular manifolds 79 and 80 mounted at the rear and forward ends of the hollow bearing support 22. Two vertically spaced flexible conduits 81 and 82 are connected from a suitable fluid pump, accumulator and valves (not shown) to said manifold 79, for supplying fluid under pressure thereto. Said conduit 81 is connected with the outside of said manifold 79 by a radially extending connector 83, threaded in the outer face thereof. Said connector communicates with a passageway 84 formed within said manifold and opening to its forward end face. A connector 85 is threaded in the forward end face of said manifold and leads from said passageway and has a flexible conduit 86 connected thereto and extending therefrom, for transmitting fluid to the forwardly spaced manifold 80. The conduit 82 is connected with the manifold 79 through a radially extending connector 87 leading to a passageway 88 extending therethrough and communicating with an opening 89 opening from the forward face of said manifold. A flexible conduit 90 is connected with said opening and leads from said opening to said manifold 80, and is connected thereto for transmitting fluid under pressure to said forwardly spaced manifold.

The manifold 80 is mounted within the forward end of the hollow bearing support 22 and extends therefrom. Said manifold, as herein shown, includes a stationary portion 94 keyed within said bearing support and a rotatable portion 95 rotatably mounted on said stationary portion and keyed within the extension arm 24 for turning movement with said extension arm.

A connector 96 on the end of the conduit 86 is threaded in a rear end face of said stationary portion of said manifold and communicates with a pressure passageway 97 formed therein. Said connector is of a swivel type, to permit connection to said manifold without twisting of said conduit. Said swivel connector, as shown in Figures 13 and 14, includes a stationary portion 99 threaded within the rear face of said manifold and a swiveling or rotatable portion 100 mounted thereon for rotatable movement about said stationary portion. A threaded sleeve 101 serves to retain said rotatable portion on said stationary portion. The forward end of said flexible conduit 86 is secured to said rotatable portion by means of a gland 102 threaded on said rotatable portion. In a like manner the forward end of the flexible conduit 86 is connected with the rear face of the stationary portion of the manifold 80 by means of a swivel connector 103, like the connector 96.

The flexible conduits 86 and 90 are herein shown as being loosely wrapped in opposite directions within the hollow bearing support 22 and around a tubular shield 91 encircling the shaft 33 and connected between the manifolds 79 and 80, to prevent rubbing of said shaft on said conduits. Said conduits are considerably longer than the distance between said manifolds 79 and 80 so as to permit the forward ends of said conduits to be connected to the rear face of the stationary portion of the manifold 80, when said manifold is removed from the forward end of said hollow bearing support, and then to permit said manifold to be inserted within said hollow bearing support and to project forwardly therefrom.

The pressure passageway 97 leads to an annular passageway 104 formed in the inner face of the rotatable portion 95 of the manifold 80 and closed by the outer periphery of the stationary portion 94 of said manifold, except for the opening from the pressure passageway 97 to said annular passageway 104. Said annular passageway communicates with two passageways 105, 105 on opposite sides thereof and having connectors 106, 106 leading radially therefrom. Flexible conduits 107, 107 connected with said connectors serve to supply fluid under pressure to the piston rod ends of the cylinders 29, 29, and to hold pressure therein and return fluid therefrom.

The connector 103 is connected with a pressure passageway 109 formed in the stationary portion 94 of the manifold 80. Said pressure passageway communicates with an annular pressure passageway 110 similar to the annular pressure passageway 104 and formed on the inner periphery of the rotatable portion 95 of said manifold and spaced forwardly of said passageway. Said annular passageway 110 communicates with passageways 111, 111 having radially extending connectors 112, 112 leading therefrom. Flexible conduits 113, 113 connect said connectors to the head ends of the cylinders 29, 29 for supplying fluid under pressure thereto, holding pressure therein, and returning fluid therefrom.

It may be seen from the foregoing that a simplified system of fluid conducting means has been provided, which upon operation of suitable control valves for the cylinders 29, 29 will supply fluid under pressure to the head or piston rod ends of said cylinders, release fluid therefrom, and hold pressure therein, in all positions of the extension arm 20 with respect to the tilting frame 19 and in all positions of the cutter head 26 with respect to said extension arm.

It may further be seen that this manifold and fluid conducting means includes a novel form and arrangement of spaced manifolds and flexible fluid conductors, connecting said manifolds together in such a manner that they may be connected to the forward manifold when outside of the hollow bearing support 22 and that when said manifold is in place in said bearing support, said conduits will be wrapped around the shield 91 encircling the hollow shaft 33, so as to conduct fluid between said manifolds and not interfere with rotation of said shaft, or be worn thereby.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In combination with a kerf-cutting machine having a base frame, an elongated tilting frame pivotally supported near its rear end on said base frame for tilting adjustment about a transverse axis and an extension arm rotatably supported at the front of said tilting frame for movement about a generally longitudinal axis, the improvement consisting of power means providing a balanced compensating drive for rotatably moving said extension arm about said longitudinal axis including two helical gears rotatable about longitudinal axes disposed on opposite sides of the axis of rotation of said extension arm, drive connections between said helical gears and opposite sides of said extension arm, so as to balance the driving reactions during rotation of said arm, two connected helical pinions meshed with said helical gears and mounted for movement along their axes of rotation, and said helical gears having teeth cut at opposite helix angles, to cause movement of said pinions along their axes of rotation, upon the transmission of unequal reactions to said pinions by said helical gears, to compensate for inaccuracies in said gears and equalize the drive therefrom.

2. In combination with a kerf-cutting machine having a base frame, a generally elongated tilting frame pivotally supported near its rear end on said base frame for tilting adjustment about a transverse axis and an extension arm rotatably supported at the front of said tilting frame for movement about a generally longitudinal axis and having a coaxial gear member operatively connected therewith, the improvement consisting of power means for rotatably moving said spur gear and extension arm including a shaft coaxial with the axis of turning movement of said extension arm, spur gears meshing with said coaxial gear on opposite sides of said extension arm so as to balance the driving reactions during rotation of the latter, and an equalizing geared drive connection to said spur gears including two helical gears, each of said helical gears being coaxial with and driving one of said spur gears and having teeth cut at opposite helix angles, and two connected helical pinions mounted on said shaft for free movement therealong and meshing with said helical gears, and moved along said shaft by the reactions of said helical gears against said pinions until the drive reactions on each of said helical gears are the same.

3. In combination with a kerf-cutting machine having a base frame, an elongated tilting frame pivotally supported near its rear end on said base frame for tilting adjustment about a transverse axis and an extension arm rotatably supported at the front of said tilting frame for movement about a generally longitudinal axis, the improvement consisting of power means providing a balanced compensating drive for rotatably moving said extension arm about said longitudinal axis including two longitudinally spaced helical gears rotatable about longitudinal axes on opposite sides of the axis of rotation of said extension arm, drive connections from said helical gears to rotatably drive said extension arm on diametrically opposite sides of the axis of rotation thereof, so as to balance the driving reactions during rotation of said arm, said helical gears having teeth cut at opposite helix angles, and two longitudinally aligned and connected helical pinions having teeth cut at opposite helix angles and meshed with said helical gears and mounted for movement with respect to said helical gears in the directions of the axes of rotation thereof upon the transmission of unequal reactions to said pinions by said helical gears, to compensate for inaccuracies in said gears and equalize the drive therefrom.

4. In combination with a kerf-cutting machine having a base frame, an elongated tilting frame pivotally supported near its rear end on said base frame for tilting adjustment about a transverse axis and an extension arm rotatably supported at the front of said tilting frame for movement about a generally longitudinal axis, the improvement consisting of power means providing a balanced compensating drive for rotatably moving said extension arm about said longitudinal axis including a motor, a self-locking worm and worm gear driven thereby, said worm gear being coaxial with the axis of rotation of said arm and serving to hold said arm in its various positions of adjustment, a shaft driven by said worm gear, two longitudinally spaced connected helical pinions mounted on said shaft for movement therealong and driven thereby, and a separate helical gear driven by each of said pinions, said helical gears being rotatable about parallel spaced longitudinal axes on opposite sides of the axis of rotation of said shaft and having drive connection with diametrically opposite sides of said arm, to provide a balanced drive therefor, one helical gear having teeth cut at one helix angle and the other helical gear having teeth cut at an opposite helix angle, and said pinions having teeth cut on helix angles opposite to the helix angles of the gears with which they mesh, to cause said gears to react against said pinions and move them along said shaft in one direction or another upon unequal reactions on said pinions caused by inaccuracies in said gears, so as to equalize the driving effect of said helical gears.

5. In combination with a kerf-cutting machine having a base frame, an elongated tilting frame pivotally supported near its rear end on said base frame for tilting adjustment about a transverse axis and an extension arm rotatably supported at the front of said tilting frame for movement about a generally longitudinal axis, the improvement consisting of power means providing a balanced compensating drive for rotatably moving said extension arm about said longitudinal axis including a motor, a self-locking worm and worm gear driven thereby, said worm gear being coaxial with the axis of rotation of said arm and serving to hold said arm in its various positions of adjustment, a shaft driven by said worm gear, two longitudinally spaced connected helical pinions mounted on said shaft for movement therealong and driven thereby, and a helical gear driven by each of said pinions, said helical gears being rotatable about parallel spaced longitudinal axes, coaxial pinions driven by said helical gears, a gear coaxial with the axis of rotation of said arm and having driving connection therewith, said last mentioned pinions meshing with said coaxial gear at diametrically opposed points, and said helical gears each having teeth cut at opposite helix angles and being so arranged that irregularities of the load on one of said helical gears will react against and move said helical pinions along said shaft, to compensate therefor.

6. In combination with a kerf-cutting machine having a base frame, an elongated tilting frame pivotally supported near its rear end on said base frame for tilting adjustment about a transverse axis and an extension arm rotatably supported at the front of said tilting frame for movement about a generally longitudinal axis, the improvement consisting of power means providing a drive for rotatably moving said extension arm about said longitudinal axis including a motor, a gear coaxial with the axis of rotation of said arm, a balanced compensating geared drive connection between said motor and said coaxial gear including two connected coaxial helical pinions having teeth cut at opposite helix angles and mounted for rotation and axial movement, a helical gear meshing with each of said pinions and geared drive connections from said helical gears to said coaxial gear, and a relatively loose driving connection between said coaxial gear and said arm, to permit relative movement between said arm and coaxial gear in directions transverse to the axis of rotation thereof.

7. In combination with a kerf-cutting machine having a base frame, an elongated tilting frame pivotally supported near its rear end on said base frame for tilting adjustment about a transverse axis and an extension arm rotatably supported at the front of said tilting frame for movement about a generally longitudinal axis, the improvement consisting of power means providing a balanced compensating drive for rotatably moving said extension arm about said longitudinal axis including a motor, a self-locking worm and worm gear driven thereby, a shaft driven by said motor, two longitudinally spaced connected helical pinions mounted on said shaft for movement therealong and driven thereby, and a separate helical gear driven by each of said pinions, said helical gears being rotatable about longitudinal axes on diametrically opposite sides of the axis of rotation of said shaft and having teeth cut on opposite helix angles, and reacting against said pinions to move said pinions along said shaft upon irregularities of the load thereon, to equalize the driving load transmitted by said helical gears, coaxial spur gears driven by said pinions, a gear coaxial with the axis of rotation of said arm and meshed with and driven by said spur gears, and a relatively loose interengaging drive connection between said gear and said arm, permitting relative movement between said arm and spur gear in directions transverse to the axis of rotation thereof.

8. In combination with a kerf-cutting machine having a base frame, an elongated tilting frame pivotally supported near its rear end on said base frame for tilting adjustment about a transverse axis and an extension arm rotatably supported at the front of said tilting frame for movement about a generally longitudinal axis and having a coaxial gear member operatively connected therewith, a pair of spur gears meshing with said coaxial gear at opposite sides of said extension arm so as to balance the driving reactions during rotation of the latter, and a compensating geared drive connection to said spur gears including two helical gears, each of said helical gears driving one of said spur gears, and a separate floating helical pinion meshed with each of said helical gears, said pinions having teeth cut at opposite helix angles and being connected to slide together in the direction of their axes of rotation and compensate for inaccuracies in the gear train driven thereby, and the connection between said coaxial gear member and said arm being a relatively loose interengaging connection to permit relative movement between said arm and said spur gear in directions transverse to the axis of rotation thereof.

9. In combination with a kerf-cutting machine having a base frame, an elongated tilting frame pivotally supported near its rear end on said base frame for tilting adjustment about a transverse axis and having a hollow bearing support projecting forwardly therefrom, a tubular extension arm rotatably supported on said hollow bearing support, for movement about a generally longitudinal axis, a cutter head supported adjacent the forward end of said arm for pivotal adjustment about an axis extending transversely of the axis of rotation thereof, a cutter chain carrying cutter bar supported on said cutter head, fluid pressure motor devices on said arm for effecting pivotal adjustment of said cutter head relative to said arm and fluid pressure supply means on said base frame, the improvement consisting in fluid conducting means connecting said supply means with said motor devices in all positions of said cutter head and arm with respect to said base frame including a stationary manifold mounted coaxially with the axis of turning movement of said arm adjacent the inner end of said hollow bearing support and having a pressure passageway therein, a second manifold mounted adjacent the outer end of said hollow bearing support and including a stationary portion secured to said hollow bearing support, and a rotatable portion rotatably mounted on said stationary portion and connected with said arm for turning movement therewith, said stationary portion having a pressure passageway formed therein and opening to its outer periphery, said rotatable portion having a pressure passageway formed therein opening to its inner periphery and registering with said passageway in said stationary portion in all positions of said rotatable portion with respect to said stationary portion, fluid connections from said pressure passageway in said rotatable portion to said motor devices, and a flexible conduit connecting said pressure passageways of said manifolds together and extending within said hollow bearing support.

10. In combination with a kerf-cutting machine having a base frame, an elongated tilting frame pivotally supported near its rear end on said base frame for tilting adjustment about a transverse axis and having a hollow bearing support projecting forwardly therefrom, a tubular extension arm rotatably supported on said hollow bearing support, for movement about a generally longitudinal axis, a cutter head supported adjacent the forward end of said arm for pivotal adjustment about an axis extending transversely of the axis of rotation thereof, a cutter chain carrying cutter bar supported on said cutter head, fluid pressure motor devices on said arm for effecting pivotal adjustment of said cutter head relative to said arm and fluid pressure supply means on said base frame, the improvement consisting in fluid conducting means connecting said supply means with said motor devices in all positions of said cutter head and arm with respect to said base frame including a stationary manifold mounted coaxially with the axis of turning movement of said arm, adjacent the inner end of said hollow bearing support and having a pressure passageway therein, a second manifold mounted adjacent the outer end of said hollow bearing support and including a stationary portion secured to said hollow bearing support, and a rotatable portion rotatably mounted on said stationary portion and connected with said arm for turning movement therewith, said stationary portion having a pressure passageway therein opening to its outer periphery, and said rotatable portion having a pressure passageway formed therein opening to its inner periphery and registering with said passageway in said stationary portion in all positions of said rotatable portion with respect to said stationary portion, fluid connections from said pressure passageway in said rotatable portion to said motor devices, and a flexible conduit mounted within said tubular extension for connecting said pressure passageways of said manifolds together, said conduit being longer than the distance between said manifolds and of a sufficient length to permit connection to said stationary portion of said forward manifold, when outside of said hollow bearing support, and to then permit said forward manifold to be inserted within said hollow bearing support.

11. In combination with a kerf-cutting machine having a base frame, an elongated tilting frame pivotally supported near its rear end on said base frame for tilting adjustment about a transverse axis and having a hollow bearing support projecting forwardly therefrom, a tubular extension arm rotatably supported on said hollow bearing support, for movement about a generally longitudinal axis, a cutter head supported adjacent the forward end of said arm for pivotal adjustment about an axis extending transversely of the axis of rotation thereof, a cutter chain carrying cutter bar supported on said cutter head, a shaft extending through said hollow bearing support and the hollow inside of said arm and journaled for rotation about an axis coaxial with the axis of turning movement of said arm, for driving said cutter chain about said cutter bar, fluid pressure motor devices on said arm for effecting pivotal adjustment of said cutter head relative to said arm, and fluid pressure supply means on said base, the improvement consisting in fluid conducting means connecting said supply means with said motor devices in all positions of said cutter head and arm with respect to said base frame including a stationary manifold mounted adjacent the rear end of said hollow bearing support and surrounding said shaft and having a plurality of pressure passageways therein, opening towards the forward end thereof, a manifold mounted within said hollow bearing support adjacent the forward end thereof and extending forwardly therefrom, said manifold having a stationary portion secured to said extension and surrounding said shaft and a rotatable portion rotatably mounted on said stationary portion and connected with said arm for rotatable movement therewith, said stationary portion having a plurality of pressure passageways formed therein, opening towards the rear end of said arm and communicating with its outer periphery, and said rotatable portion having a plurality of pressure passageways formed therein opening to its inner periphery, and registering with said passageways in said stationary portion in all positions of said rotatable portion with respect to said stationary portion, and a plurality of flexible conduits connecting said spaced manifolds together and extending within said arm and wrapped around said shaft in opposite directions when said manifolds are in place in said arm, said conduits being sufficiently long to permit connection to said stationary part of said forward manifold when outside of said arm and to then permit said forward manifold to be inserted within said arm.

12. In combination with a kerf-cutting machine including a base frame, an elongated tilting frame pivotally supported on said base frame and having a hollow bearing support projecting forwardly therefrom, a tubular extension arm rotatably supported on said hollow bearing support, a cutter head pivotally supported adjacent the forward end of said arm, a cutter chain carrying cutter bar supported on said cutter head, fluid pressure operated motor devices on said arm for effecting pivotal adjustment of said cutter head relative to said arm, a source of supply for fluid under pressure on said base frame, the improvements comprising fluid conducting means connecting said source of supply for fluid under pressure with said motor devices including a stationary manifold adjacent the inner end of said hollow bearing support and having a pressure passageway therein, fluid connections from said source of supply to said stationary manifold, a longitudinally spaced second manifold mounted adjacent the outer end of said bearing support and including two registering manifold portions, one of which is relatively movable with respect to the other, the movable manifold portion having fluid connection with said motor devices, and the stationary manifold portion having a pressure passageway therein having fluid connection with said pressure passageway in said movable manifold portion in all positions of said manifold portions with respect to each other, and a flexible conduit extending along said bearing support and connecting said pressure passageway in said stationary portions of said manifolds together.

13. In combination with a kerf-cutting machine including a base frame, an elongated tilting frame pivotally supported on said base frame and having a hollow bearing support projecting forwardly therefrom, a tubular extension arm rotatably supported on said hollow bearing support, a cutter head pivotally supported adjacent the forward end of said arm, a cutter chain carrying cutter bar supported on said cutter head, fluid pressure operated motor devices on said arm for effecting pivotal adjustment of said cutter head relative to said arm and a source of supply for fluid under pressure on said base frame, the improvements comprising fluid conducting means connecting said source of supply for fluid under pressure with said motor devices in the various positions of adjustment of said cutter head and arm with respect to said base frame including a stationary manifold adjacent the inner end of said hollow bearing support and having a pressure passageway therein, fluid connections from said source of supply for fluid under pressure to said stationary manifold, a second manifold mounted adjacent the outer end of said bearing support and including two registering manifold portions, one portion of which is relatively movable with respect to the other, the stationary portion of said manifold having a pressure passageway therein opening to said other portion, said movable portion of said manifold having a pressure passageway communicating with said passageway in said stationary portion in all positions of said movable portion with respect to said stationary portion, fluid connections from said pressure passageway in said movable manifold portion to said motor devices, and a flexible conduit extending within said bearing support within said arm and connecting said spaced manifolds together, said conduit being wrapped around said shaft and being sufficiently long to permit connection to said stationary manifold portion of said forward manifold when outside of said arm and to then permit said forward manifold to be inserted within said arm.

HERMAN W. DRIEHAUS.

REFERENCES CITED

The following references are of record in the file of this patent:

UNITED STATES PATENTS

| Number | Name | Date |
|---|---|---|
| 1,432,954 | Berthold | Oct. 24, 1922 |
| 1,879,573 | Sponable | Sept. 27, 1932 |
| 2,163,341 | Joy | June 20, 1939 |
| 2,182,127 | Joy | Dec. 5, 1939 |
| 2,323,493 | Sloane | July 6, 1943 |